US012782529B2

(12) United States Patent
Scharf et al.

(10) Patent No.: US 12,782,529 B2
(45) Date of Patent: Nov. 3, 2026

(54) METHOD AND DEVICE FOR DETECTING DIRT ON A VIEWING WINDOW OF A LIDAR

(71) Applicant: MERCEDES-BENZ GROUP AG, Stuttgart (DE)

(72) Inventors: Andreas Scharf, Stuttgart (DE); David Peter, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 744 days.

(21) Appl. No.: 18/037,348

(22) PCT Filed: Nov. 10, 2021

(86) PCT No.: PCT/EP2021/081186
§ 371 (c)(1),
(2) Date: May 17, 2023

(87) PCT Pub. No.: WO2022/106271
PCT Pub. Date: May 27, 2022

(65) Prior Publication Data
US 2024/0012121 A1 Jan. 11, 2024

(30) Foreign Application Priority Data
Nov. 18, 2020 (DE) ..................... 10 2020 130 481.1

(51) Int. Cl.
*G01S 7/497* (2006.01)
*G01S 7/481* (2006.01)
(Continued)

(52) U.S. Cl.
CPC ............ *G01S 7/497* (2013.01); *G01S 7/4817* (2013.01); *G01S 17/931* (2020.01);
(Continued)

(58) Field of Classification Search
CPC .............................................. G01S 2007/4975
See application file for complete search history.

(56) References Cited

U.S. PATENT DOCUMENTS

| | | | | |
|---|---|---|---|---|
| 9,025,071 | B2 | 5/2015 | Mirbach et al. | |
| 2003/0069674 | A1 | 4/2003 | Stam et al. | |
| 2010/0283888 | A1* | 11/2010 | Mirbach | H04N 5/2226 348/E5.045 |

(Continued)

FOREIGN PATENT DOCUMENTS

| | | | |
|---|---|---|---|
| CN | 105405109 | A | 3/2016 |
| DE | 102017222618 | A1 | 6/2019 |

(Continued)

OTHER PUBLICATIONS

Office Action created Jan. 23, 2024 in related/corresponding JP Application No. 2023-530025.

(Continued)

*Primary Examiner* — Eric L Bolda
(74) *Attorney, Agent, or Firm* — PATENT PORTFOLIO BUILDERS PLLC

(57) ABSTRACT

Dirt on a viewing window of a lidar is detected using a laser beam transmitted into a detection region and detecting light that is present in the detection region. An intensity image is generated as a greyscale image of intensities of laser reflections from the light reflected and detected as a result of the transmission of the laser beam. A background light image is generated as a greyscale image of background light from the light detected without transmitting a laser beam. The intensity image and the background light image are analyzed with respect to common features. When a number of common features falls below a predetermined number, it is concluded that there is dirt on the viewing window.

8 Claims, 2 Drawing Sheets

Figure 1:
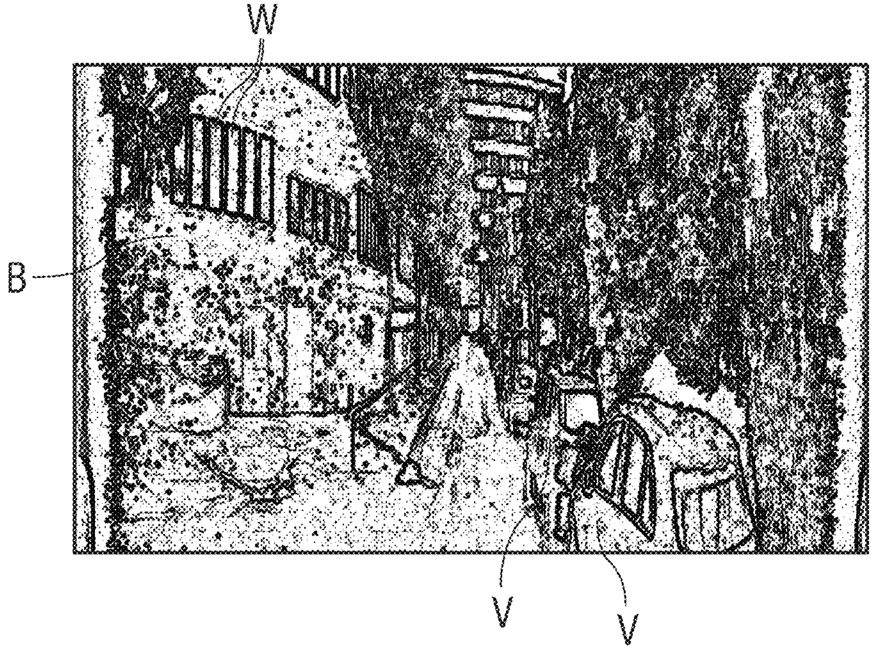

(51) Int. Cl.

| | |
|---|---|
| ***G01S 17/931*** | (2020.01) |
| ***G06T 7/00*** | (2017.01) |
| ***G06T 7/12*** | (2017.01) |

(52) U.S. Cl.

CPC .............. *G06T 7/0002* (2013.01); *G06T 7/12* (2017.01); *G01S 2007/4975* (2013.01); *G06T 2207/10028* (2013.01); *G06T 2207/30252* (2013.01)

(56) References Cited

U.S. PATENT DOCUMENTS

| | | | |
|---|---|---|---|
| 2014/0270532 A1 | 9/2014 | Sawaki et al. | |
| 2016/0169671 A1 | 6/2016 | Winter | |
| 2019/0033459 A1* | 1/2019 | Tisdale | G01S 7/497 |
| 2019/0377072 A1* | 12/2019 | Astrom | G02B 27/0006 |
| 2021/0041539 A1 | 2/2021 | Darrer et al. | |
| 2021/0141090 A1 | 5/2021 | Nakamura | |
| 2021/0402960 A1 | 12/2021 | Inoue | |

FOREIGN PATENT DOCUMENTS

| | | |
|---|---|---|
| DE | 102018126289 A1 | 4/2020 |
| DE | 102019121340 A1 | 2/2021 |
| EP | 3428686 A1 | 1/2019 |
| JP | H075114 A | 1/1995 |
| JP | 2002188994 A | 7/2002 |
| JP | 2004271404 A | 9/2004 |
| JP | 2008164537 A | 7/2008 |
| JP | 2010534000 A | 10/2010 |
| JP | 2015028427 A | 2/2015 |
| JP | 2017181105 A | 10/2017 |
| WO | 2019142675 A1 | 7/2019 |
| WO | 2020021914 A1 | 1/2020 |
| WO | 2020100892 A1 | 5/2020 |

OTHER PUBLICATIONS

Office Action dated Jul. 23, 2025 in related/corresponding CN Application No. 202180077425.0.

International Search Report and Written Opinion mailed Feb. 9, 2022 in related/corresponding International Application No. PCT/EP2021/081186.

Office Action created Oct. 6, 2021 in related/corresponding DE Application No. 10 2020 130 481.1.

Office Action dated Feb. 12, 2025 in related/corresponding KR Application No. 2023-7015772.

* cited by examiner

METHOD AND DEVICE FOR DETECTING DIRT ON A VIEWING WINDOW OF A LIDAR

BACKGROUND AND SUMMARY OF THE INVENTION

Exemplary embodiments of the invention relate to a method for detecting dirt on a viewing window of a lidar, as well as to a device for detecting dirt on a viewing window of a lidar.

The recognition of contamination on a viewing window of a lidar represents a challenge in particular for automated vehicles, for example level 3 or higher. Contamination leads to a degradation of the sensor performance and thus to a limitation of the safety and availability of the mentioned systems. Lidars are active sensors and have a transmitter, for example one or more laser diodes, and a receiver, for example one or more avalanche photodiodes, in particular single-photon avalanche diodes.

A method for recognizing contamination in lidar systems is known from DE 10 2017 222 618 A1, which has the following steps:

- targeted emission of electromagnetic radiation into an environment of the lidar system by means of a transmitter unit, wherein the electromagnetic radiation emitted by the transmitter unit is transmitted into the environment through an exit window, which separates the lidar system from the environment at least in the emission direction of the transmitter unit;
- detecting a proportion of the electromagnetic radiation emitted by the transmitter unit back-scattered into the lidar system on a surface of the exit window by means of a contamination sensor, wherein the contamination sensor is a single diode, a 1D array detector, or a 2D array surface detector for detecting electromagnetic radiation and/or the contamination sensor is integrated into the receiver unit;
- Determining a level of contamination of the exit window by evaluating the detection of the contamination sensor.

Exemplary embodiments of the invention are directed to an improved method compared to the prior art and an improved device for detecting dirt on a viewing window of a lidar.

A method for detecting dirt on a viewing window of a lidar, for example a windscreen, is proposed according to the invention, wherein

- by means of a transmitter of the lidar, a laser beam is transmitted into a detection region, and
- by means of a receiver of the lidar, light present in the detection region is detected.

It is provided according to the invention that

- an intensity image is generated as a greyscale image of intensities of laser reflections from the light reflected and detected as a result of the transmission of the laser beam,
- a background light image is generated as a greyscale image of background light from the light detected without transmitting a laser beam,
- the intensity image and the background light image are analyzed with respect to common features and
- when a number of common features falls below a predetermined number, it is concluded that there is dirt on the viewing window.

Due to the active illumination from the interior of the sensor, intensities of the reflections show a different sensitivity to contamination of the viewing windows compared to the background light, so that an assessment of the level of contamination is possible.

In one embodiment, the laser beam is transmitted in a pulse-like manner.

In one embodiment, the background light image is identified shortly before the transmission of the laser beam. A temporally close sequence of receiving the background light image and the intensity image is in particular advantageous when using the method in a motor vehicle, during a journey, since approximately the same scene is recorded in both greyscale images.

In one embodiment, features of buildings and/or vehicles and/or windows are identified in the intensity image and in the background light image.

In one embodiment, edges are recognized by means of an edge detection algorithm in the intensity image and in the background light image.

In one embodiment, edge distances and/or edge positions are identified based on the recognized edges.

According to one aspect of the present invention, a device for detecting dirt on a viewing window of a lidar is proposed, comprising a data processing unit, which is connected to the lidar and is configured for carrying out the method described above.

Further, a motor vehicle comprising such a device is proposed, in particular an automated vehicle, for example level 3 or higher.

Further, an application of the method described above or of the device described above in a motor vehicle is proposed. An application for other autonomous platforms, like lorries, buses, or robots, which use a LiDAR for navigation, is also possible.

Exemplary embodiments of the invention are illustrated in greater detail below by means of drawings.

BRIEF DESCRIPTION OF THE DRAWING FIGURES

Figure 2:
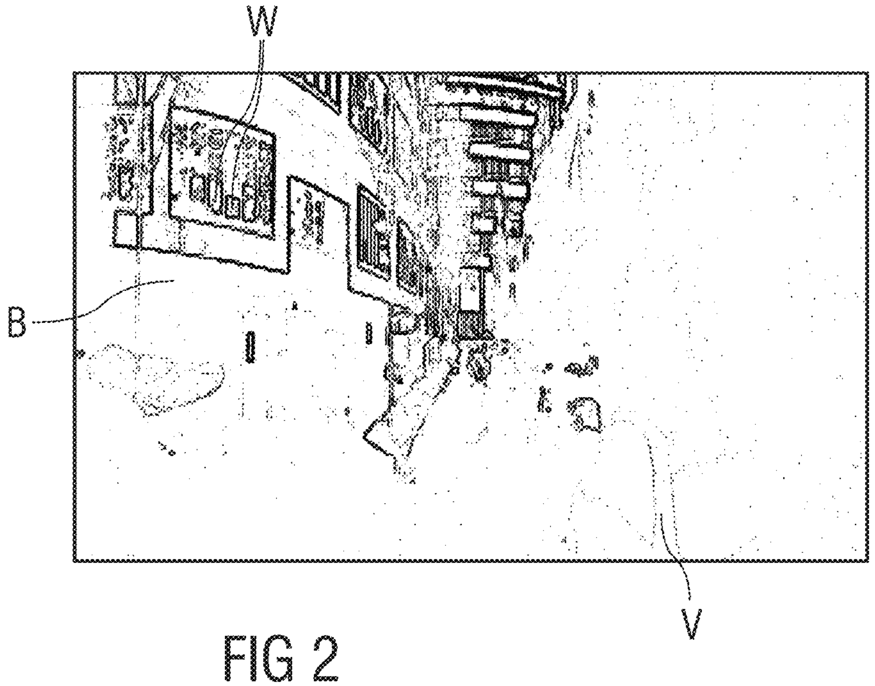
Figure 3:
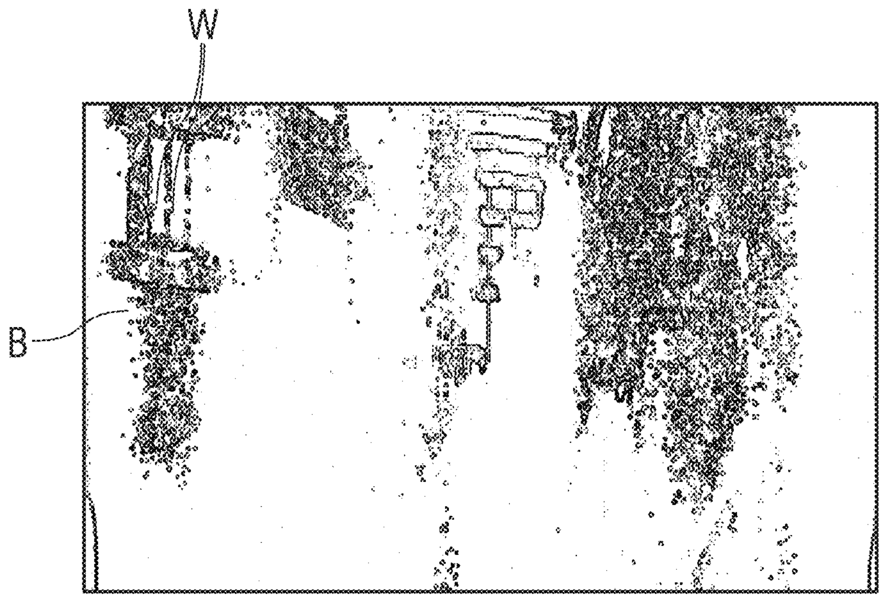
Figure 4:
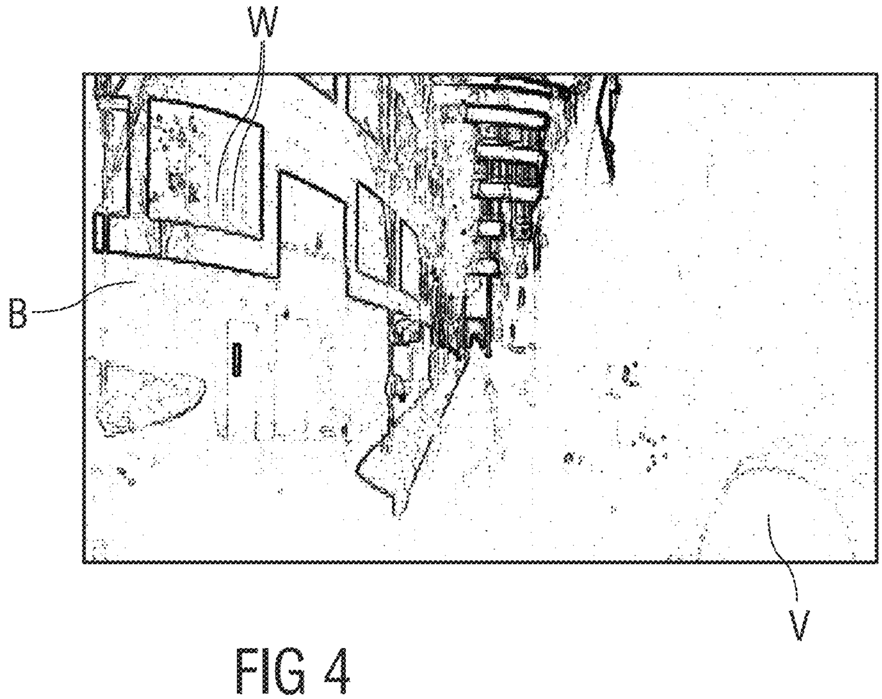

Here are shown:

FIG. 1 a schematic view of a greyscale image of the intensity of the laser radiation recorded by means of a lidar, with a clean viewing window, FIG. 2 a schematic view of a greyscale image of background light recorded by means of a lidar, with a clean viewing window, FIG. 3 a schematic view of a greyscale image of the intensity of reflected laser radiation recorded by means of a lidar, with water droplets on the viewing window, and FIG. 4 a schematic view of a greyscale image of background light recorded by means of a lidar, with water droplets on the viewing window.

Parts that correspond to one another are provided with the same reference numerals in all figures.

DETAILED DESCRIPTION

The invention relates to a method for detecting dirt on a viewing window of a lidar, for example a windscreen. A lidar is an active sensor and has at least one transmitter, for example one or more laser diodes, and at least one receiver, for example one or more avalanche photodiodes, in particular single-photon avalanche diodes. In the method according to the invention, the transmitter transmits a pulse-like laser beam and the receiver detects reflections of the laser beam off objects within a detection region. With suitable receivers, additional information, like intensities of the reflections and background light of the scene, is also made available along with the distance information. This additional information shows a different degree of sensitivity for contaminations of the viewing window. The background light can, for example, be identified by a greyscale image being recorded by the receiver, without the transmitter transmitting a laser beam, for example shortly before the transmission of the laser beam.

FIG. 1 is a schematic view of a greyscale image of the intensity of the laser radiation recorded by means of a lidar, referred to in the following as an intensity image, with a clean viewing window. FIG. 2 is a schematic view of a greyscale image of background light recorded by means of a lidar, referred to in the following as a background light image, with a clean viewing window. In both illustrations, buildings B, vehicles V and windows W can be visually recognized.

For a lidar that provides this additional information, suitable features of the intensity image and of the background light image, for example edges, in particular road markings or edges of windows in walls of buildings, are therefore compared using methods for image processing. With edge detection algorithms known from the field of image processing, edges can be extracted from the background light image and the intensity image. For both resulting edge images, edge features are now calculated, for example edge distances, edge positions, etc. and are subsequently compared with each other. With this comparison, a measure for the similarity between the intensity image and the background light image can be obtained. If the number of common features lies above a certain threshold value, then the images are interpreted as being similar and it is concluded that there is no contamination.

If there are few or no common features as shown in FIGS. 3 and 4, i.e., the number of common features does not exceed the certain threshold value, then the images are interpreted as being dissimilar and it is concluded that there is a contamination of the viewing window.

FIG. 3 is a schematic view of a greyscale image of the intensity of reflected laser radiation recorded by means of a lidar, referred to in the following as an intensity image, with water droplets on the viewing window. FIG. 4 is a schematic view of a greyscale image of background light recorded by means of a lidar, referred to in the following as a background light image, with water droplets on the viewing window. The clearly identifiable buildings B, vehicles V and windows W in the background light image in FIG. 4 can only be recognized with difficulty or not at all in the intensity image in FIG. 3.

The threshold value can be defined sensor-specifically. The method can be used for the whole detection region of the lidar or for a section, for localized detection of contamination.

The proposed method for detecting contamination may function to a limited extent if there are few or no structures/edges within the field of vision of the lidar sensor, for example when recording a monochrome wall or the sky. When being used in road traffic, such scenarios are, however, the exception. A minimum number of features in the sensor field of vision, in particular structures and/or edges, that can be considered necessary for detecting contamination can be defined sensor-specifically.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

B building
V vehicle
W window

The invention claimed is:

1. A method for detecting dirt on a viewing window of a lidar, the method comprising:
- transmitting, by a transmitter of the lidar, a laser beam into a detection region;
- detecting, using a receiver of the lidar, light present in the detection region without transmitting the laser beam;
- generating an intensity image as a greyscale image of intensities of laser reflections from light reflected and detected as a result of the transmission of the laser beam;
- generating a background light image as a greyscale image of background light from the light detected without transmitting the laser beam;
- recognizing, using an edge detection algorithm, edges in the intensity image and in the background light image;
- analyzing the intensity image and the background light image for common features based on the recognized edges in the intensity image and in the background light image; and
- determining that there is dirt on the viewing window when a number of common features between the intensity image and the background light image is below a predetermined number.

2. The method of claim 1, wherein the transmission of the laser beam comprises transmitting the laser beam in a pulse-like manner.

3. The method of claim 1, wherein the light present in the detection region without transmitting the laser beam is detected prior to the transmission of the laser beam.

4. The method of claim 1, wherein the common features include buildings, vehicles, or windows.

5. The method of claim 1, further comprising:
- identifying edge distances or edge positions as features based on the recognized edges.

6. A device for detecting dirt on a viewing window of a lidar, the device comprising:
- the lidar; and
- a processor coupled to the lidar, wherein the processor is configured to
  - instruct a transmitter of the lidar to transmit a laser beam into a detection region;
  - instruct a receiver of the lidar to detect light present in the detection region without transmitting the laser beam;

generate an intensity image as a greyscale image of intensities of laser reflections from light reflected and detected as a result of the transmission of the laser beam;

generate a background light image as a greyscale image of background light from the light detected without transmitting the laser beam;

recognize, using an edge detection algorithm, edges in the intensity image and in the background light image;

analyze the intensity image and the background light image for common features based on the recognized edges in the intensity image and in the background light image; and determine that there is dirt on the viewing window when a number of common features between the intensity image and the background light image is below a predetermined number.

7. A motor vehicle, comprising:

a device for detecting dirt on a viewing window of a lidar, the device comprising:

the lidar; and a processor coupled to the lidar, wherein the processor is configured to instruct a transmitter of the lidar to transmit a laser beam into a detection region;

instruct a receiver of the lidar to detect light present in the detection region without transmitting the laser beam;

generate an intensity image as a greyscale image of intensities of laser reflections from light reflected and detected as a result of the transmission of the laser beam;

generate a background light image as a greyscale image of background light from the light detected without transmitting the laser beam;

recognize, using an edge detection algorithm, edges in the intensity image and in the background light image;

analyze the intensity image and the background light image for common features based on the recognized edges in the intensity image and in the background light image; and determine that there is dirt on the viewing window when a number of common features between the intensity image and the background light image is below a predetermined number.

8. The motor vehicle of claim 7, wherein the motor vehicle is an autonomous motor vehicle.

* * * * *